United States Patent [19]
Gill et al.

[11] Patent Number: 5,262,061
[45] Date of Patent: Nov. 16, 1993

[54] ZINC, IRON AND MANGANESE STABILIZATION USING POLYETHER POLYAMINO METHYLENE PHOSPHONATES

[75] Inventors: Jasbir S. Gill, Moon Township; Charles J. Schell; Nancy S. Sherwood, all of Moon Township, all of Pa.

[73] Assignee: Calgon Corporation, Pittsburgh, Pa.

[21] Appl. No.: 907,257

[22] Filed: Jul. 1, 1992

[51] Int. Cl.$^5$ .................................................. C02F 5/14
[52] U.S. Cl. ................................... 210/700; 210/701; 252/180
[58] Field of Search ........................ 210/698–701; 252/180, 181

[56] References Cited

U.S. PATENT DOCUMENTS

| | | | |
|---|---|---|---|
| 3,349,031 | 10/1967 | Hatch et al. | 210/721 |
| 4,080,375 | 3/1978 | Quinlan | 210/700 |
| 4,552,665 | 11/1985 | Ralston et al. | 210/697 |
| 4,783,267 | 11/1988 | Boffardi et al. | 210/699 |
| 4,872,996 | 10/1989 | Grierson et al. | 210/700 |
| 4,931,189 | 6/1990 | Dhawan et al. | 210/700 |
| 5,112,496 | 5/1992 | Dhawan et al. | 210/700 |

*Primary Examiner*—Peter Hruskoci
*Attorney, Agent, or Firm*—Craig G. Cochenour; William C. Mitchell; Raymond M. Speer

[57] ABSTRACT

Polyether polyamino methylene phosphonates, when added to various industrial water systems in concentrations between 0.1 mg/L and 50 mg/L, stabilize soluble zinc, manganese and iron ions and their reaction products, in desirable forms and reduced particle sizes. In particular, this stabilization can be achieved under severe conditions which include elevated pH, high dissolved solids content, and high saturation levels of calcium carbonate.

7 Claims, No Drawings

ZINC, IRON AND MANGANESE STABILIZATION USING POLYETHER POLYAMINO METHYLENE PHOSPHONATES

BACKGROUND OF THE INVENTION

1. Field of the Invention

Stabilization of soluble manganese and its reaction products

The present invention relates to the use of polyether polyamino methylene phosphonates to stabilize soluble manganese ions and their reaction products in desirable forms and reduced particle sizes. Manganese exists in various oxidation states from 1 through 7, with the oxidation states of 2 and 7 being the most stable, and therefore the predominant forms in nature. The present invention is intended to include stabilization of manganese ions for all of these oxidation states. Manganese ions are often found in well waters and cooling waters. Anionic species of carbonate, bicarbonate, sulfite, fluoride, chloride, sulfate, and so forth, and dissolved oxygen may be present in both waters. Oxygen reaction products of manganese and iron can collect on metal surfaces and accelerate corrosion and reduce heat transfer.

Oxidation leads to precipitation of dark brown or black hydrous oxides or hydroxides of the higher oxidation states of manganese which are very insoluble. Manganese hydroxide, $MN(OH)_2$, is especially a problem. When these precipitates remain suspended in the water, they cause objectionable discoloration known as "black water"; when they settle out, black deposits form which can block lines, or act as catalysts causing further manganese deposition. These deposits are very deleterious in textile and laundry operations as they interfere with dying processes and leave spots which are difficult to remove. They appear to increase the corrosion of copper. Manganese hydroxide, $MN(OH)_2$, while it is usually present as a colloidal suspension, when it does form a deposit, it readily becomes the site for the promotion of the deposit of other scaling materials, thereby accelerating scaling in general.

The polyether polyamino methylene phosphonates, when used in accordance with the method of the present invention, can keep the reaction products of manganese described above in colloidal/fine dispersed form rather than the normal flocculant, adherent species. The manganese thus remains soluble so that it will not form particles which will precipitate out of solution and form scale.

Stabilization of soluble iron and its reaction products

The present invention further relates to the use of polyether polyamino methylene phosphonates to stabilize soluble iron ion and its reaction products in desirable forms and reduced particle sizes. Ferrous and ferric ions are often found in well waters while cooling waters contain primarily the ferric species. Iron ions are often present as the result of rusting of the iron piping used to transport the water in a cooling system. Anionic species of carbonate, bicarbonate, sulfite, fluoride, chloride, sulfate, and so forth, and dissolved oxygen may be present in both waters. Oxygen reaction products of iron can collect on metal surfaces and accelerate corrosion and reduce heat transfer.

Oxidation leads to precipitation of brown or red oxides of the higher oxidation states of iron which are insoluble. When these precipitates remain suspended in the water, they cause objectionable discoloration known as "red water"; when they settle out, red deposits form which can block lines, or act as catalysts causing further iron reaction product deposition. These deposits are very deleterious in textile and laundry operations as they interfere with dying processes and leave spots which are difficult to remove. $FE(OH)_2$, while it is usually present as a colloidal suspension, when it does form a deposit, it readily becomes the site for the promotion of the deposit of other scaling materials, thereby accelerating scaling in general.

The polyether polyamino methylene phosphonates, when used in accordance with the method of the present invention, can keep the reaction products of iron described above in colloidal/fine dispersed form rather than the normal flocculant, adherent species. The iron thus remains soluble so that it will not form particles which will precipitate out of solution and form scale.

The present invention further relates to the use of polyether polyamino methylene phosphonates to stabilize soluble zinc ion and its reaction products in desirable forms and reduced particle sizes. Zinc ions are often found in well waters, while cooling waters can also contain zinc ions. $Zn^{++}$ present in cooling waters is often derived from the zinc metal used in making the copper and brass alloys from which the piping used for transporting the cooling water is constructed. Anionic species of carbonate, bicarbonate, sulfite, fluoride, chloride, sulfate, and so forth, and dissolved oxygen may be present in both waters. Oxygen reaction products of zinc can collect on metal surfaces and accelerate corrosion and reduce heat transfer. Zinc hydroxide, $Zn(OH)_2$, has been found to be a particular problem. While it is usually present as a colloidal suspension, when it does form a deposit, it readily becomes the site for the promotion of the deposit of other scaling materials, thereby accelerating scaling in general.

The combination products of the zinc ions and the anionic species recited above can often settle out, creating deposits which can block lines, or act as catalysts causing further zinc reaction product deposition. These deposits can be very deleterious in textile and laundry operations as they interfere with dying processes and leave spots which are difficult to remove.

The polyether polyamino methylene phosphonates, when used in accordance with the method of the present invention, can keep the reaction products of zinc described above in colloidal/fine dispersed form rather than the normal flocculant, adherent species. The zinc thus remains soluble so that it will not form particles which will precipitate out of solution and form scale.

The stabilization methods described above are especially useful under conditions of high pH and high calcite concentrations, e.g., those found in cycled up cooling towers. Various industrial and commercial water-carrying systems are subject to zinc, iron and manganese deposit formation problems. These deposits form frequently in the tubes of heat exchangers and on other heat exchange surfaces, such as those in cooling towers. Particular systems or applications areas where severe conditions, especially high alkalinity, lead to exceptional buildup of zinc, iron and manganese deposits, in addition to cycled up cooling towers, include reverse osmosis systems, sugar refining evaporators, and certain types of gas scrubbers.

The polyether polyamino methylene phosphonates used in the methods of the present invention, are usually used in greater amounts than threshold inhibitors in the stabilization methods of the present invention, more closely resembling sequestering or chelating agents in amounts. The compositions of the present invention have dispersant properties as well and significantly reduce the adherency of any deposits which are formed, facilitating their easy removal.

Particular problems are encountered when attempting to prevent deposits of zinc, iron and manganese compounds under severe conditions, where conventional treatments do not provide complete control, and where high alkalinity causes precipitation of hydroxide salts due to increased insolubility. Conventional treatment can be used to inhibit zinc, iron and manganese deposits under normal conditions of alkalinity, e.g., up to 100 to 120 times calcite saturation, i.e., a water containing $Ca^{2+}$ and $CO^{2-}_3$ present at 100 times (100 X) their solubility limit of calcium as calcite (calcite is the most common crystalline form of calcium carbonate). However, what is desired are inhibitors effective in greater than 150X water, especially in greater than 250X water, and more especially in greater than 300 X water, i.e., where the calcite ions can be prevented from precipitating as calcium carbonate scale using substoichiometric amounts of an inhibitor. The polyether phosphonate compositions used in the methods of the present invention are especially useful under severe conditions characterized by a calcite saturation level of 150X and above, especially 250X and above, and more especially 300X and above, as defined in the paragraph immediately below.

Another characteristic feature of the severe conditions under which the polyether phosphonate compositions used in the methods of the present invention are especially useful is high pH, i.e. a pH of 8.5 and higher, particularly a pH of 9 or 10 or even higher.

One of the particular advantages of the polyether phosphonate compositions used in the methods of the present invention is the exceptional calcium tolerance which they exhibit. Calcium tolerance is a measure of a chemical compound's ability to remain soluble in the presence of calcium ions ($Ca^{2+}$). As pH increases, calcium tolerance decreases rapidly for many compounds which might be used to control zinc, iron and manganese deposits, and they precipitate with calcium at alkaline pH's, rendering them useless. While it is common practice to use an acid feed to the water of, e.g., a cooling tower system in order to lower pH and thus avoid the calcium tolerance problem, the danger to handlers which such acid feeding poses makes it all the more important to find inhibitors of zinc, iron and manganese deposits which operate at high pH's.

2. Brief Description of the Prior Art

Methods which have been used heretofore to remove manganese include those whereby the manganous ion is oxidized to insoluble higher oxides, hydrous oxides, or hydroxides, which precipitate and may be removed by coagulation and settling, filtration, or both. The oxidation has also been effected by raising the pH of the water to 8 or higher where naturally occurring dissolved oxygen or mechanical aeration brings about oxidation, or by the use of chlorine or permanganate. All of these methods, however, suffer from obvious disadvantages which limit their usefulness and effectiveness. For example, the use of a high pH to facilitate oxidation by dissolved oxygen is expensive and tends to cause scale deposition. Chlorine is only slightly more active than dissolved oxygen for oxidation of manganese and also requires pH elevation. Permanganate is expensive and imparts to the water an intense color that may be unacceptable.

One method for removing the manganese by precipitation and removal involves the addition of a salt of iron, copper, or cobalt and any compound yielding bisulfite ions in solution to the manganese-containing water. See Hatch - U.S. Pat. No. 3,349,031.

Soluble manganese ion and its reaction products have been stabilized in water systems using carboxylic acid/sulphonic acid copolymers. See Ralston - U.S. Pat. No. 4,552,665.

U.S. Pat. No. 4,080,375 discloses methylene phosphonates of amino-terminated oxyalkylates for use as scale inhibitors, but these compositions are not the same as those of the present invention, nor is there any suggestion that such compositions would be useful for stabilizing zinc, iron and manganese. U.S. Pat. No. 4,931,189 discloses aminomethylene phosphonates of the type used in the method of the present invention, but for inhibiting oil field scale formation involving a high brine environment susceptible to gypsum or barite scale formation. Such use in no way suggests the stabilization of zinc, iron and manganese described herein.

U.S. Pat. No. 4,783,267 discloses a method for stabilizing metal ions in recirculating water systems using 2-hydroxyphosphonacetic acid. The metal ions stabilized include iron, zinc, aluminum, and manganese. There is no suggestion, however, of use of the polyether phosphonates of the present invention.

The polyether polyamino methylene phosphonates of the type which are used to stabilize zinc, iron and manganese in the compositions of the present invention, are described in copending U.S. patent application Ser. No. 07/708,527, filed May 31, 1991. While their use for the control of calcium carbonate scale under severe conditions which include elevated pH and high calcium carbonate saturation levels, is described, there is no suggestion of their use to stabilize zinc, iron and manganese.

SUMMARY OF THE INVENTION

The present invention relates to a method of inhibiting the precipitation of dissolved zinc, iron and manganese ions and their reaction products in an aqueous system, comprising the step of treating said system with an effective precipitation-inhibiting amount of a polyether polyamino methylene phosphonate of the following formula:

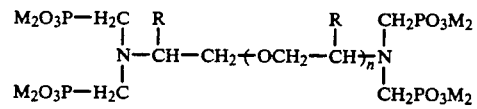

and optionally the N-oxides thereof; where n is an integer or fractional integer which is, or on average is, from about 2 to about 12, inclusive; M is hydrogen or a suitable cation; and each R may be the same or different and is independently selected from hydrogen and methyl.

A preferred subclass of compositions of the above formula is that wherein M is hydrogen, R is methyl, and n is from about 2 to about 3, most preferably an average of about 2.6.

In particular, the present invention relates to such a treatment method in which the aqueous system being treated is characterized by the severe conditions of a pH of at least 8.5, especially 9.0 or greater, and a calcite concentration of at least 250X, especially 300X or greater; and the polyether phosphonate is used in an amount sufficient to achieve a concentration of from 0.1 to 50 mg/L in said aqueous system, preferably from 1.0 to 10 mg/L, and most preferably from 2 to 5 mg/L.

The present invention further relates to a method of inhibiting the precipitation of dissolved zinc, iron and manganese ions and their reaction products in an aqueous system, comprising the step of treating said system with an effective precipitation-inhibiting amount of a composition comprising a polyether polyamino methylene phosphonate of the formula above, together with a polymer additive comprising one or more members selected from the group consisting of: homo- and co-polymers including terpolymers comprising one or more of acrylamide (AM), acrylic acid (AA), 2-acrylamide-methyl propane sulfonic acid (AMPSA), methacrylic acid (MAA), itaconic acid (IA), polyethylene glycol monomethacrylate (PGM), maleic anhydride (MA), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid, sodium salt (AHPS), and vinyl phosphonic acid, wherein the weight average molecular weight for such polymer additives is in the range of from about 500 to 250,000.

In particular, the present invention relates to such a method in which for the above formula for the polyether phosphonate, M is hydrogen, R is methyl, and n is from about 2 to about 3, most preferably an average of about 2.6; the aqueous system being treated is characterized by the severe conditions of a pH of at least 8.5, especially 9.0 or greater, and a calcite concentration of at least 250×, especially 300× or greater; and the polyether phosphonate is used in an amount sufficient to achieve a concentration of from 0.1 to 50 mg/L in said aqueous system, preferably from 1.0 to 10 mg/L, and most preferably from 2 to 5 mg/L; and said polymer additive is a member selected from the group copolymers of the following weight percent compositions: 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

The present invention still further relates to a composition for inhibiting the precipitation of dissolved zinc, iron and manganese ions and their reaction products in an aqueous system, comprising a polyether polyamino methylene phosphonate of the formula above. The present invention also relates to a composition comprising a polyether phosphonate of the formula above in combination with a polymer additive which is a member selected from the group consisting essentially of those enumerated above. In particular, the present invention relates to such a composition in which for the above formula for the polyether phosphonate, M is hydrogen, R is methyl, and n is from about 2 to about 3, most preferably an average of about 2.6; and said polymer additive is a member selected from the group copolymers of the following weight percent compositions: 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

DETAILED DESCRIPTION OF THE INVENTION

The active ingredient in the compositions and methods of the present invention for inhibiting the precipitation of dissolved zinc, iron and manganese ions and their reaction products in an aqueous system, especially one characterized by severe conditions of high pH and high calcite concentration, is a polyether polyamino methylene phosphonate of the formula:

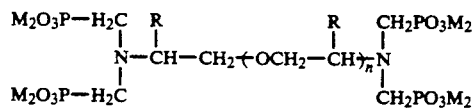

and optionally the N-oxides thereof; where n is an integer or fractional integer which is, or on average is, from about 2 to about 12, inclusive; M is hydrogen or a suitable cation; and each R may be the same or different and is independently selected from hydrogen and methyl. A preferred subclass of compositions of the above formula is that wherein M is hydrogen, R is methyl, and n is from about 2 to about 3, most preferably an average of about 2.6.

In order to obtain high levels of control of zinc, iron and manganese deposits, especially under the severe conditions defined herein, it has been found that there are certain essential components of the structure of such polyether polyamino methylene phosphonate or N-oxides which are necessary to provide that performance. For example, the N,N-bis(phosphonomethyl)amino portion of the structure is essential. Whether this group is present initially in the phosphonic acid form or as an alkali metal or other salt of the acid, has no critical bearing on the performance of the overall molecule. At the pH's under which the phosphonate compositions function, they are, and must be, in their ionized form. Thus, it is not critical whether "M" is hydrogen or a suitable cation, and the selection of an appropriate salt form is well within the skill of the art. Alkali metal salts are the most simple, and are preferred for that reason. Overall, however, it is preferred that M is hydrogen.

The polyether polyamino methylene phosphonate may be in the N-oxide form: N→O. This group confers significant resistance to degradation by chlorine and bromine biocides, or mixtures thereof, which may be present in the aqueous system being treated, presumably by preventing oxidative attack on the nitrogen atom of the group.

A preferred structural feature of the polyether polyamino methylene phosphonates and N-oxides useful as deposit control agents is the isopropyl group which bridges the diphosphonomethylamino group and the polyether group. This group can also be an ethylene moiety.

Another structural element of the phosphonate zinc, iron and manganese deposit inhibitors is the polyether moiety. Since the polyether polyamino methylene phosphonates are prepared by phosphonomethylation of the appropriate diamine, the character of the polyether moiety will depend upon the way in which the amine starting material is made. Processes for making such polyether diamines are known in the art; and attention is directed particularly to U.S. Pat. No. 3,236,895, which describes preparation of a variety of polyether diamines especially useful in preparing the phosphonate final products used as deposit control agents in the present invention.

In accordance with the processes set out in U.S. Pat. No. 3,236,895 and related processes described in the prior art, it is possible to prepare any one of a number of desired polyether diamines within the scope of the present invention. In the general formula for the polyether polyamino methylene phosphonates used herein, the polyether moiety is simply represented by the formula:

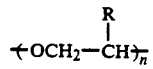

Since R may be hydrogen or methyl, both ethyleneoxy and propyleneoxy units are possible. Moreover, R is to be independently chosen, i.e., ethyleneoxy and propyleneoxy units may alternate in various patterns, including blocks of each, or they may be all one or the other. For example, the following are just some of the polyether segments which might be prepared to form the basis for the corresponding diamines, which would then be used to make phosphonates within the scope of the present invention (where EO=ethyleneoxy, and PO=propyleneoxy): EO;

PO; EO-EO;
PO-PO;
EO-PO;
EO-EO-EO;
PO-PO-PO;
EO-EO-PO;
EO-PO-EO;
EO-PO-PO;
PO-EO-PO;
EO-EO-EO-EO;
PO-PO-PO-PO;
EO-PO-PO-PO;
EO-EO-PO-PO;
EO-EO-EO-PO;
EO-PO-EO-PO;
EO-PO-PO-EO;
PO-EO-EO-PO

In the above examples, "n" in the main formula would be an integer of from 1 to 4. Since "n" is defined as being from 1 to 12, an even larger number of possible polyether moieties is included. However, it has been found that generally the polyether polyamino methylene phosphonates of lower molecular weight, i.e., where "n" is a smaller integer, are those which provide the greatest amount of scale inhibition under the severe conditions of high pH and high calcite concentration, and thus are those which are preferred. Examples of some of these preferred phosphonates are shown in the table below, where Z=methylenephosphonate:

$$Z_2-N-\overset{R_z}{\underset{|}{C}}HCH_2-(OCH_2\overset{R_a}{\underset{|}{C}}H)_a-(OCH_2\overset{R_b}{\underset{|}{C}}H)_b-NZ_2$$

| Id. No. | a | b | $R_z$ | $R_a$ | $R_b$ |
|---|---|---|---|---|---|
| A | 2 | 1 | CH$_3$ | H | CH$_3$ |
| B | 2.6* | 0 | CH$_3$ | CH$_3$ | — |
| C | 2 | 0 | CH$_3$ | CH$_3$ | — |
| D | 8.5* | 1 | CH$_3$ | H | CH$_3$ |
| E | 5.6* | 0 | CH$_3$ | CH$_3$ | — |
| F | 2 | 0 | H | H | — |
| G | 3 | 0 | H | H | — |
| H | 3 | 0 | CH$_3$ | CH$_3$ | — |
| I | 3 | 1 | H | CH$_3$ | H |
| J | 4 | 0 | H | CH$_3$ | — |

*= the value of "n" on average.

It will be noted from the table above that in several cases, "n" has an average value, i.e., the number of repeating ethyleneoxy or propyleneoxy units may vary. Thus, it is possible to have a mixture of varying chain lengths of polyoxyethylene or polyoxypropylene in the final product. This is also contemplated to be within the scope of the present invention, so long as the requirements with respect to the limit of "n" are observed. Consequently, while "n" is merely defined as an integer or fractional integer which is, or on average is, from about 2 to about 12, it has two aspects. It defines the total of the number of repeating ethyleneoxy and/or propyleneoxy units considered separately, and thus if "n" is, e.g., 4, it includes 4 propyleneoxy units, 3 propyleneoxy units and 1 ethyleneoxy unit, 2 propyleneoxy units and 2 ethyleneoxy units, and so forth. The value of "n" may also represent an average number, and this is always the case, of course, when it is a fractional integer. In this case, for each of the ethyleneoxy and/or propyleneoxy units considered separately, mixtures of these units may be present so as to give an average value for "n". For example, in the table above, for Id. No. D, the total of "a" and "b" is 9.5, which is the value of "n". What is described is a mixture of polyether phosphonates in which all of them have an isopropyl bridging group and an ethyleneoxy moiety, but the repeating propyleneoxy units are such that on average their value is about 8.5.

The number of repeating ethyleneoxy or oxypropylene units, designated by the subscript "n", determines the total molecular weight of the overall polyether polyamino methylene phosphonate or corresponding N-oxide, and thus plays a critical role in determining the scale inhibiting performance of that phosphonate. It has been found that in order to provide adequate scale control under the severe conditions of use defined herein, it is necessary that "n" be an integer or fractional integer which is, or on average is, from about 2 to about 12, inclusive.

As discussed above, the reason for "n" being potentially a fractional integer arises from the fact that the primary diamine from which the polyether polyamino methylene phosphonates are prepared by phosphonomethylation may be a mixture of polyethers in which "n" is two or more of 2, 3, 4, 5 and so forth, in varying proportions. For example, a preferred polyether polyamino methylene phosphonate for use in the compositions and methods of the present invention has a molecular weight of approximately 632 and the value of "n" on average is about 2.6. Thus, this type of polyether phosphonate has a molecular weight distribution, i.e., of the various polyoxypropylenes which make it up, and this distribution is represented by a fractional integer average value for "n". But, it is also within the scope of the present invention for "n" to be a whole integer, e.g., 11311, which usually designates a single molecular weight and not a molecular weight distribution.

The polyether polyamino methylene phosphonate and corresponding N-oxides of the compositions and methods of the present invention are prepared first by phosphonomethylation of the appropriate primary amine which already contains the polyoxyethylene and polyoxypropylene moieties, followed by an oxidation step which provides the N-oxide moieties.

Such primary amine starting materials and their method of preparation are well known. The phosphonomethylation of the primary amine is then carried out by a Mannich reaction such as that described in K. Moedritzer and R. Irani, *J. Organic Chem.* 31(5) 1603-7, "The Direct Synthesis of alpha-Aminomethyl Phosphonic Acids; Mannich-Type Reactions with Orthophosphorous Acid", May 1966. In a typical reaction, the primary amine is added to a mixture of phosphorous acid and water, and concentrated hydrochloric acid is then added slowly, after which the reaction mixture is heated to reflux with addition of aqueous formaldehyde.

Although the general structural formula employed herein indicates that the nitrogen atom is completely phosphonomethylated, as a practical matter, preparation of the polyether polyamino methylene phosphonate and corresponding N-oxides of the present invention, as described in detail further below, usually results in only about 80 to 90% phosphonomethylation. Other side products give N-substitution with H, $CH_3$, $CH_2OH$, etc. It is not practical, as a matter of simple production economics, however, to isolate and purify the completely phosphonomethylated compounds, since the side products just described do not interfere with zinc, iron and manganese deposit inhibition. Such side products, are consequently, usually allowed to remain, and the test data set out further below is based on test samples containing such side products. Consequently, the activity levels obtained would be even higher were 100% active compound being tested.

Once the desired phosphonomethylated polyoxypropylene diamine has been prepared as described above, the N-oxide final product of the present invention is then prepared by a step of oxidation, which may be accomplished, e.g., simply by adding hydrogen peroxide to a basic solution of the phosphonomethylated diamine and heating the reaction mixture, which gives high yields of the N-oxide final product. Of course, it is also possible to use other well known techniques for carrying out such a step of oxidation, and any number of these may be successfully employed.

The amounts of any particular polyether polyamino methylene phosphonate that are required to be added for the desired maximum inhibition of zinc, iron and manganese deposit formation will be such as to provide an ultimate concentration in the aqueous system being treated of between 0.1 and 50 mg/L, and preferably this concentration will be between 5 and 30 mg/L. Most preferably the concentration will be between 10 and 20 mg/L, although it is understood that many factors, of the type which have been explained in detail with regard to the background to the present invention, will determine the actual amount of polyether phosphonate which will be added to any particular aqueous system in order to achieve the maximum amount of inhibition of zinc, iron and manganese deposit formation in that aqueous system. The calculation of those amounts will be well within the skill of the artisan in this field.

When the polyether polyamino methylene phosphonate used in the methods and compositions of the present invention are used in combination with one or more of the polymers recited further above, the amounts of that combination which must be added in order to inhibit zinc, iron and manganese deposition in an aqueous system, will as a general matter be within the ranges of amounts sufficient to establish the ranges of concentrations of the polyether phosphonates and corresponding N-oxides used alone, as recited in detail above. Again, however, calculation of the actual amount is well within the skill of the art.

The manner of addition of any particular polyether polyamino methylene phosphonate to an aqueous system will also be straightforward to a person of ordinary skill in this art. It may be added in finely subdivided solid form by mechanical dispensers of known design. It may also be added in solid form, but in the form of a matrix in which solid particles of the active ingredient are bonded or bound together by a material which is water soluble, or optionally, does not dissolve at all. Such a matrix allows for regular leaching out or dissolving of the active ingredient particles, whereby it is possible to obtain a sustained release and more unvarying concentration of the polyester phosphonates in the water being treated. The particular polyether phosphonate may also be made up in the form of concentrated solutions for dispensing in liquid form from dispensers well known in the art. The polyether phosphonates may also be combined with other chemical treatment agents for dispensing to the aqueous system, and these in combination may be dispensed in solid or liquid form.

The phrase "aqueous system" as used herein is meant to include any system containing water; including, but not limited to, cooling water systems including cooling towers, boiler water systems, desalination systems, gas scrubber units, blast furnaces, sewage sludge dewatering systems, thermal conditioning equipment, reverse osmosis units, sugar evaporators, paper processing systems, mining circuits, and the like.

EXAMPLES OF PREFERRED EMBODIMENTS

The following examples demonstrate the effectiveness of the treatment methods of the present invention in reducing lead solubility in water. These examples are illustrative only, and are not intended to be a limitation of the present invention.

EXAMPLE 1

Manganese Stabilization

Procedure: Conditions: The 2 hour study was done using a gang stirrer at temperature: 25° C and stagnant flasks at 60° C; while the 24 hour study was done by incubating flasks at 60° C. The pH in all cases was 9.0, and the total alkalinity ($HCO_3/CO_3$) of 400 mg/L was added to 4×Pittsburgh water of the following composition:

| Ion | Ion Concentration (mg/L) |
|---|---|
| $Mg^{++}$ | 24 |
| $Ca^{++}$ | 88 |
| $SO_4^{2-}$ | 329 |
| $Na^+$ | 56 |
| $Cl^-$ | 70 |

Inhibitor: the polyether phosphonate test compound employed was that of the main formula wherein M=H, R=$CH_3$ in all cases, and n=on average about 2.6.

The inhibitor was added to a known volume (500−[inhibitor volume+manganese volume+$HCO_3$/$CO_3$ volume]) of 4×Pittsburgh water (pH adjusted to 8.8), followed by manganese solutions (1.0 g/L). Using a 2.00 mL volumetric pipet, 2.00 mL of 1.00 g/L $Mn^{+2}$ stock solution was pipeted under the surface of the water. (The $Mn^{+2}$ stock solution was prepared using 4.125 mL per liter of 50% Manganous Nitrate, which equals 3.257 g/L of $MN(NO_3)_2$.) In order to oxidize the Mn up to oxidation state 7 and thereby duplicate natural aeration, there was added $H_2O_2$ just prior to adjusting the pH to 9.0 using 0.050M NaOH, followed by the addition of alkalinity: $HCO_3$/$CO_3$ (80/20) solution. The $H_2O_2$ amount was adjusted to the amount of Mn (1 ppm $H_2O_2$ per 1 ppm Mn). The total volume of the flask was 500 mL. The flasks were closed with rubber stoppers and incubated for 2 and 24 hours. For the 2 hour gang stirrer study, the total volume was brought up to 1000 mL in a beaker. At the end of the equilibration time, 50 mL of each test solution was filtered through 0.25 μm filter paper, acidified with concentrated HCl, and analyzed by atomic absorption spectroscopy. The final result was calculated in accordance with the following equation:

$$\% \text{ Mn Stablzd.} = \frac{\text{Mn w/Inhib.} - \text{Mn w/No Inhib.}}{\text{Mn Initially Added} - \text{Mn w/No Inhib.}} \times 100$$

Results: Following the above procedure, the following results were obtained:

TABLE 1

Manganese Stabilization
pH = 9.0; $HCO_3$/$CO_3$ = 400 mg/L

| TEST DOSE (mg/L) | CONCENTRATION | | | METAL ION % RECOVERY IN SOLUTION | | % STABILIZATION | |
|---|---|---|---|---|---|---|---|
| | INIT'L | FINAL 2 Hrs. | FINAL 24 Hrs. | 2 Hrs. | 24 Hrs. | 2 Hrs. | 24 Hrs. |
| 10.0 | 1.0 | 0.98 | 0.68 | 98 | 68 | 90 | 57 |
| 15.0 | 1.0 | 0.99 | 0.88 | 99 | 88 | 95 | 84 |
| 10.0 | 2.0 | 1.95 | 0.81 | 98 | 41 | 78 | 20 |
| 20.0 | 2.0 | 1.97 | 1.44 | 99 | 72 | 87 | 62 |

EXAMPLE 2

Iron Stabilization

The same general procedures as described above for Example 1 were employed. Using a 2.00 mL volumetric pipet, 2.00 mL of 1.00 g/L $Fe^{+2}$ stock solution was pipeted under the surface of the water. (The $Fe^{+2}$ stock solution was prepared fresh using 7.02 grams of $Fe(NH_4)_2(SO_4)_2 \cdot 6H_2O$ and 10.0 mL of concentrated $H_2SO_4$ per total volume of 1.00 liter.) The acidified filtrates and diluted $Fe^{+2}$ stock solution were analyzed using atomic absorption spectroscopy. The values were multiplied by 1.05 to account for dilution during acidification. The percent (%) stabilization was calculated as follows:

$$\% \text{ Fe Stablzd} = \frac{\text{Fe w/Inhib.} - \text{Fe w/No Inhib.}}{\text{Fe Initially Added} - \text{Fe w/No Inhib.}} \times 100$$

Results: Following the above procedure the following results were obtained:

TABLE 2

Iron Stabilization
pH = 9.0; $HCO_3$/$CO_3$ = 400 mg/L

| TEST DOSE (mg/L) | CONCENTRATION | | | METAL ION % RECOVERY IN SOLUTION | | % STABILIZATION | |
|---|---|---|---|---|---|---|---|
| | INIT'L | FINAL 2 Hrs. | FINAL 24 Hrs. | 2 Hrs. | 24 Hrs. | 2 Hrs. | 24 Hrs. |
| 10.0 | 1.0 | 1.0 | 0.59 | 100 | 59 | 100 | 59 |
| 15.0 | 1.0 | 1.0 | 0.68 | 100 | 68 | 100 | 58 |
| 10.0 | 2.0 | 1.96 | 0.99 | 98 | 50 | 98 | 50 |
| 20.0 | 2.0 | 1.98 | 1.59 | 99 | 80 | 99 | 80 |

EXAMPLE 3

Zinc Stabilization

The same general procedures as described above for Example 1 were employed. The ionic matrix was a water containing 160 mg/L of Ca and 200 mg/L of sulfate. Additionally, 400 mg/L of $HCO_3$/$CO_3$ was added to the water and the pH was adjusted to 9.0. The percent (%) stabilization was calculated as follows:

$$\% \text{ Zn Stablzd} = \frac{\text{Zn w/Inhib.} - \text{Zn w/No Inhib.}}{\text{Zn Initially Added} - \text{Zn w/No Inhib.}} \times 100$$

Results: Following the above procedure the following results were obtained:

TABLE 3

Zinc Stabilization
pH = 9.0; $HCO_3$/$CO_3$ = 400 mg/L

| TEST DOSE (mg/L) | CONCENTRATION | | | METAL ION % RECOVERY IN SOLUTION | | % STABILIZATION | |
|---|---|---|---|---|---|---|---|
| | INIT'L | FINAL 2 Hrs. | FINAL 24 Hrs. | 2 Hrs. | 24 Hrs. | 2 Hrs. | 24 Hrs. |
| 10.0 | 2.0 | 1.67 | 1.66 | 84 | 84 | 83 | 82 |
| 15.0 | 2.0 | 2.00 | 1.99 | 100 | 100 | 100 | 100 |
| 10.0 | 5.0 | 2.05 | 2.07 | 41 | 41 | 38 | 38 |
| 20.0 | 5.0 | 3.66 | 3.66 | 73 | 73 | 72 | 72 |

EXAMPLE 4

Effect of Temperature

The effects of temperature on stabilization results were observed by selecting data from that set out in Examples 1-3 above and presenting it to show temperature effects. That selected data is set out in the table of values below:

TABLE 4

Effect of Temperature on Zinc/Manganese/Iron
Stabilization (pH = 9.0; $HCO_3$/$CO_3$ = 400 mg/L)

| TEST DOSE (mg/L) | METAL ION | CONCENTRATION | | | | % STABILIZATION | |
|---|---|---|---|---|---|---|---|
| | | INITIAL 25° C. | INITIAL 60° C. | FINAL AFTER 2 HRS 25° C. | FINAL AFTER 2 HRS 60° C. | 25° C. | 60° C. |
| 10 | Zinc | 2.0 | 2.0 | 1.67 | 1.66 | 83 | 82 |
| 10 | Iron | 2.0 | 2.0 | 1.96 | 1.26 | 98 | 63 |
| 10 | Mngnse | 2.0 | 2.0 | 1.95 | 1.12 | 78 | 39 |

As shown in the data above, stabilization was studied at two different levels of metal ion concentration and three levels of test dose for the polyether phosphonate stabilizer. The % stabilization was found to depend on both metal ion concentration and stabilizer test dose. Metal ion recovery in solution was found to increase with increasing stabilizer dose and was found to decrease with increasing metal ion concentration. Zinc stabilization did not change with time from 2 hours to 24 hours; however, for both manganese and iron, stabilization was found to be sharply reduced between 2 and 24 hours. It is conjectured that a slow oxidation of iron and manganese may have been responsible for precipitation of those ions with time. This may represent the combined effect of time and temperature on iron and manganese oxidation. The results in Table 4 indicate some deterioration of iron and manganese stabilization at 60° C. after 2 hours, while zinc stability remains unchanged after 2 hours, even at 60° C. The polyether phosphonate stabilizer was found to be stable to $H_2O_2$ oxidation, since no breakdown of the stabilizer was observed in any of the above experiments.

What is claimed is:

1. A method of inhibiting the precipitation of dissolved zinc, iron and manganese ions and their reaction products in an aqueous system containing water having $Ca^{+2}$ and $CO_3^{-2}$ present greater than 250 times their solubility limit and comprising the step of treating said system with an effective precipitation-inhibiting amount of a polyether polyamino methylene phosphonate of the following formula

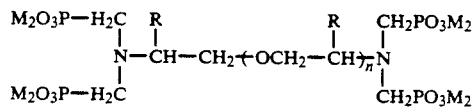

and optionally the N-oxides thereof; where n is an integer or fractional integer which is, or on average is, from about 2 to about 12, inclusive; M is hydrogen or a suitable cation; and each R may be the same or different and is independently selected from hydrogen and methyl.

2. A method according to claim 1 wherein in the above formula for the polyether phosphonate, M is hydrogen, R is methyl, and n is an average of about 2.6.

3. A method according to claim 1 in which the polyether phosphonate is used in an amount sufficient to achieve a concentration of from 0.1 to 50 mg/L in said aqueous system.

4. The method of claim 1 wherein the concentration of polyether phosphonate is from 1.0 to 10 mg/L.

5. A method of inhibiting the precipitation of dissolved zinc, iron and manganese ions and their reaction products in an aqueous system containing water having $Ca^{+2}$ and $CO_3^{-2}$ present greater than 250 times their solubility limit and a pH of at least about 8.5 comprising the step of treating said system with an effective precipitation-inhibiting amount of a polyether polyamino methylene phosphonate of the following formula:

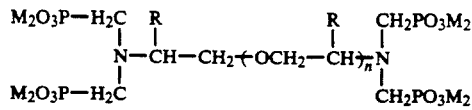

and optionally the N-oxides thereof; where n is an integer or fractional integer which is, or on average is, from about 2 to about 12, inclusive; M is hydrogen or a suitable cation; and each R may be the same or different and is independently selected from hydrogen and methyl;

Together with a polymer additive comprising; one or more members selected from the group consisting of: homo- and copolymers including terpolymers comprising one or more of acrylamide (AM), acrylic acid (AA), 2-acrylamide-methyl propane sulfonic acid (AMPSA), methacrylic acid (MAA), itaconic acid (IA), polyethylene glycol monomethacrylate (PGM), maleic anhydride (MA), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid, sodium salt (AHPS), and vinyl phosphonic acid, wherein the weight average molecular weight for such polymer additives is in the range of from about 500 to 250,000.

6. A method according to claim 5 in which for the above formula for the polyether phosphonate, M is hydrogen, R is methyl, and n is an average of about 2.6; the polyether phosphonate is used in an amount sufficient to achieve a concentration of from 0.1 to 50 mg/L in said aqueous system; and said polymer additive is a member selected from the group consisting essentially of 90/10 to 10/90 AA/AMPSA, the following weight percent compositions 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

7. A method according to claim 6 wherein the polyether phosphonate is used in an amount sufficient to achieve a concentration of from 1.0 to 10 mg/L in said aqueous system.

* * * * *